Figure 1:
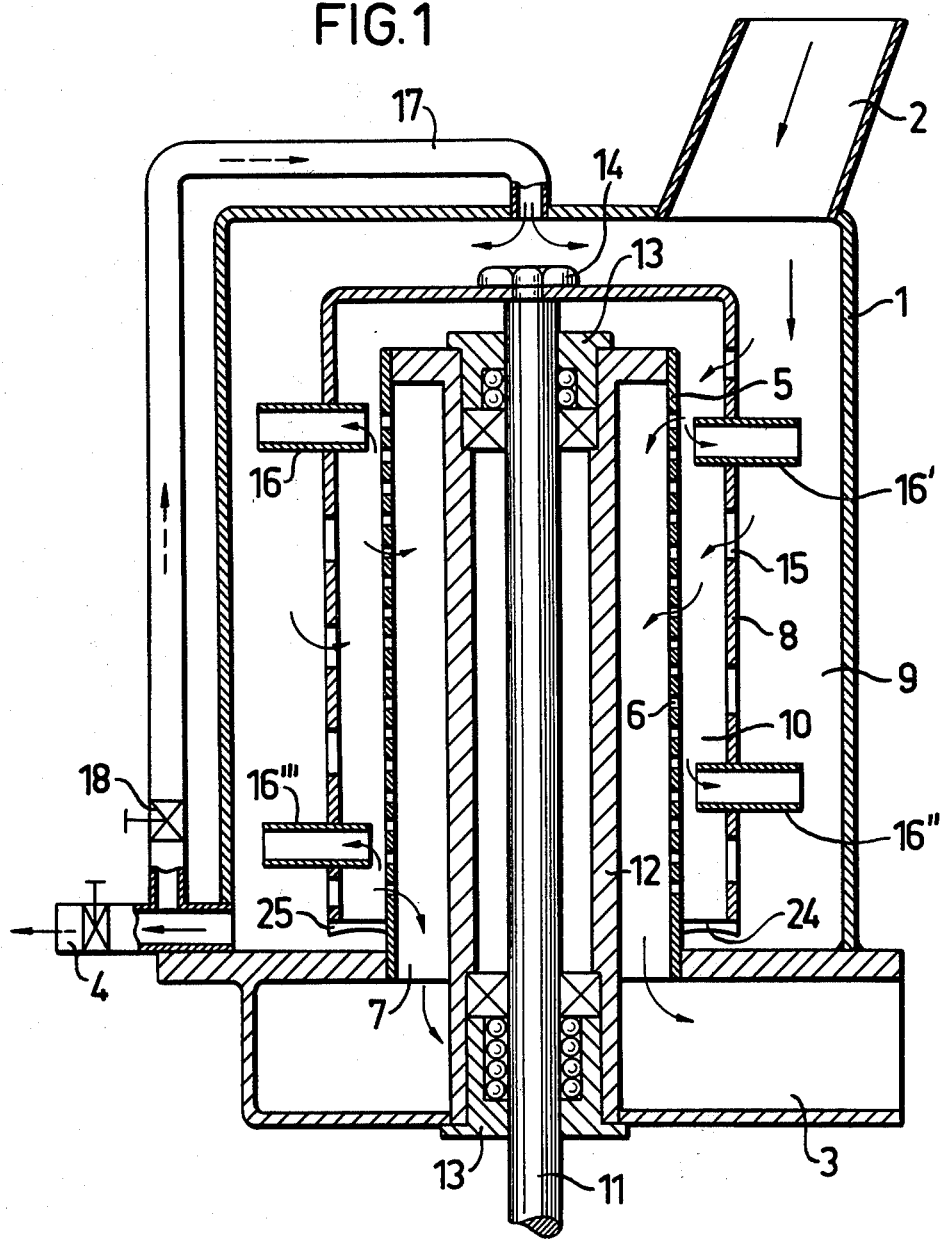

United States Patent [19]

Norman et al.

[11] 4,346,007

[45] Aug. 24, 1982

[54] METHOD AT SCREENING APPARATUS FOR CLEANING THE APERTURES IN A SCREEN PLATE AND DEVICE FOR CARRYING OUT THE METHOD

[75] Inventors: Bo Norman, Johanneshov; Karl-Johan Grundström, Solna, both of Sweden

[73] Assignee: Svenska Traforskningsinstitutet, Stockholm, Sweden

[21] Appl. No.: 183,065

[22] Filed: Sep. 2, 1980

Related U.S. Application Data

[63] Continuation of Ser. No. 17,720, Mar. 5, 1979, abandoned.

[30] Foreign Application Priority Data

Mar. 8, 1978 [SE] Sweden .............................. 7802653

[51] Int. Cl.³ ..................... B01D 33/10; B01D 35/16; B01D 45/18
[52] U.S. Cl. .................................. 210/360.1; 210/391
[58] Field of Search .................. 210/360.1, 360.2, 361, 210/369, 370, 378, 380.1, 780, 784, 391–393

[56] References Cited

U.S. PATENT DOCUMENTS 3,939,065 2/1976 Ahlfors.
4,066,552 1/1978 Caine.

FOREIGN PATENT DOCUMENTS 7211251-9 8/1972 Sweden.

Primary Examiner—Frank Sever
Attorney, Agent, or Firm—Cushman, Darby & Cushman

[57] ABSTRACT

A centrifugal screening apparatus is provided with screen cleaning means including rotating nozzles which clean the screen of the apparatus by suction.

14 Claims, 8 Drawing Figures

METHOD AT SCREENING APPARATUS FOR CLEANING THE APERTURES IN A SCREEN PLATE AND DEVICE FOR CARRYING OUT THE METHOD

This is a continuation of application Ser. No. 17,720, filed Mar. 5, 1979, now abandoned.

This relates to a method of cleaning at a screening apparatus the apertures in the screen plate comprised in the apparatus and to a device for carrying out the method.

When material suspensions, especially paper pulp suspensions, are subjected to screening, a number of factors have to be observed:
1. The degree of fluidization in the suspension must be sufficient for maintaining the material free from flocculation, which may obstruct the passage of the material through the apertures of the screen member.
2. Suspensions with high material concentration must be permitted to be screened efficiently.
3. Long and slim particles, such as shives, must be separated owing to their length and rigidity, so that orientation in the plane of the screen member and flow along the screen member are desirable.
4. The apertures in the screen member must be as small as possible in order to render it possible to effectively separate impurities.
5. The apertures in the screen member must be cleaned from cloggings at short intervals.
6. The material concentration in the accepts portion and rejects portion must not differ substantially from the concentration in the injects portion.

At a screening apparatus for cleaning and fractionating material suspensions, which is known, for example, through the Swedish Laid Out Document No. 7211251-9, the cleaning is effected substantially by means of a cylindric fine screen drum, where pulsation members are provided on a coarse screen drum rotating concentrically with the fine screen drum. The pulsation members are designed in principle as bulgings or bosses on one or both sides of the coarse screen drum shell. By this arrangement, in addition to an inward flow of the suspension also a return outward flow through a smaller part of the apertures in the coarse screen drum is obtained by means of the "foil effect". The object of this is to keep the apertures in the fine screen drum clean and to prevent heavier particles from collecting on the inside of the coarse screen drum. The pulsation members at the same time bring about a certain fluidization of the suspension and should partially also contribute to an orientation of shives possibly contained in the suspension. The three functions, viz. cleaning of the screen plate, fluidization of the suspension and orientation of shives, are carried out by means of one single type of members provided on the coarse screen drum, viz. the pulsation members. This implies that the optimization of one function has a detrimental effect on the two other functions, and that, therefore, a compromise paying regard to all three functions of the pulsation members is to be made.

The known arrangement, therefore, does not solve the problems that the concentration in the accepts portion is lower and in the rejects portions substantially higher than in the injects portion.

The present invention renders it possible, due to its characterizing features as they are defined in the attached claims, to optimize the different functions individually without affecting the other functions.

The invention above all brings about a very efficient cleaning of the apertures in the screen plate by pump means provided on the inject side of said plate, which pump means during their movement have swept over every aperture in the screen plate.

It is hereby possible to screen material suspensions with substantially higher concentrations than it has been possible with conventional screens.

Figure 2:
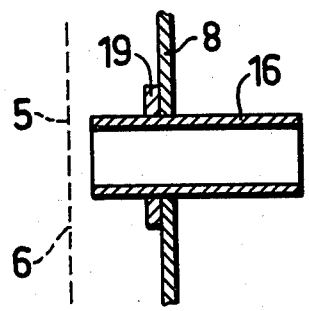
Figure 3:
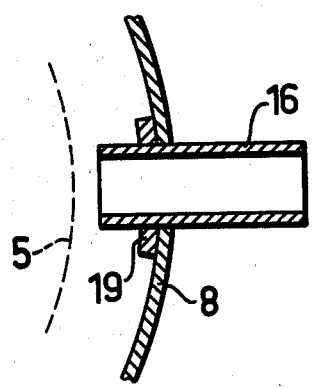
Figure 4:
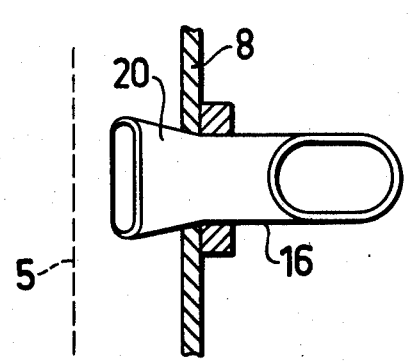
Figure 5:
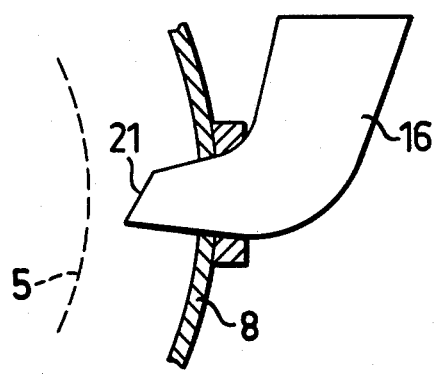
Figure 6:
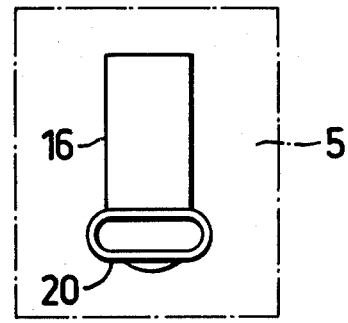
Figure 7:
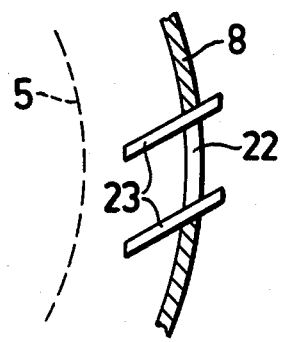
Figure 8:
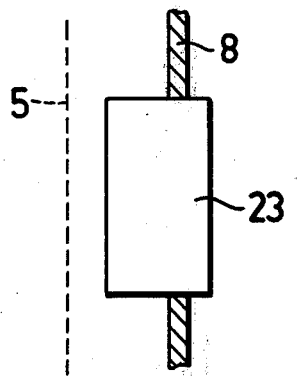

The invention is described in the following by way of examples with reference to the accompanying drawings, in which FIG. 1 shows a screening apparatus provided with pump means according to the invention, seen by way of a section from the side, FIG. 2 shows a pump means seen from the side of the screening apparatus, FIG. 3 shows the same pump means seen from above, FIGS. 4 and 5 show another embodiment of the pump means seen in corresponding views, FIG. 6 shows the pump means according to FIGS. 4 and 5 seen from the screen drum, and FIGS. 7 and 8 show a further embodiment of the pump means according to the invention.

The screening apparatus shown in FIG. 1 substantially is intended to be used for suspensions rich in fibers, for example paper pulp suspensions. The screening apparatus comprises a housing 1 with an inlet 2 for the medium to be screened, an accept outlet 3 and a reject outlet 4. Within said housing 1 a stationary screen drum 5 of cylindric design is mounted which is provided with screen apertures 6, for example holes or slots, the size of which is dimensioned in an established manner. The housing 1 is closed downwardly and is provided inside of the screen drum 5 with an opening 7 via which the accept leaves the apparatus through the accept outlet 3.

A downwardly open cleaning drum 8 is mounted rotary about the screen drum 5 and divides the space outside the same into an outer screen space 9 and an inner screen space 10. The cleaning drum 8 is supported on and driven by a shaft 11, which is mounted in bearings 13 supported in the stand 12. The cleaning drum is shown attached on the shaft by a nut 14, and it has on its cylindric surface a number of apertures 15, which are substantially greater than the apertures 6 in the screen drum 5.

The cleaning drum 8 further is provided with a plurality of pump means 16 in the form of cylindric pipes, only some of which are shown in the Figure. Every pipe 16 extends with one end almost all the way to the screen drum 5, and its other end is located in the outer screen space 9. The distance between the screen drum 5 and the pipe end can be, for example, between 1 and 55 mm, but values outside this range may also occur. The pipes 16 shall be located axially along the cleaning drum 8 so that after one revolution of the drum at the latest the entire portion of the screen drum 5 which is provided with screen apertures 6 has been swept over by the pipe ends. The pipes 16 also shall have such a division on the cleaning drum 8, that this drum is sufficiently balanced. As an example of such an arrangement the pipe 16 can be imagined located highest up on the cleaning drum 8, and diametrically to this pipe, but slightly (for example one pipe diameter) below the same, the next pipe 16' is located. The near pair of adjacent pipes are slightly angularly offset to the pipes 16,16' a.s.o. all the way to the next to last pipe 16" and the pipe 16''' located diametrically thereto. A conduit 17 including a control and stop valve 18 connects the reject outlet 4 with the space above the cleaning drum 8.

In the following, the function of the screening apparatus provided with pump means according to the invention is described briefly.

The cleaning drum 8 is rotated with a suitable number of revolutions. The material suspension is charged via the inlet 2 into the outer screen space 9 and thereafter via the apertures 15 in the cleaning drum 8 to the inner screen space 10. Through the apertures 15, thus, the inner screen space 10 and thereby also the screen drum 5 are supplied with pulp suspension, which is maintained fluidized by the speed energy, which is supplied at the acceleration through the apertures 15. The cleaning drum 8 also acts as a coarse screen, thereby preventing greater impurities from entering the inner screen space 10. The pump means 16 clean the apertures 6 in the screen drum 5 by locally sucking clean the drum surface owing to the sucking effect maintained by the rotation of the cleaning drum 8. Impurities or flocculated fibres clogging the apertures 6 in the screen drum 5 are removed through the pump pipes and transported a long distance away from the screen drum 5. For a new approach to the drum 5, the flocculated fibres once again must pass through the apertures 15 in the rotating cleaning drum 8 and can thereby be fluidized so that single fibres can be accepted. An intense mixing of the pulp suspension is maintained between the two screen spaces 9 and 10 by the recirculation via the pump pipes 16 and the apertures 15 which counteracts differences in concentration between accept and reject.

The suction effect is determined directly by the centrifugal force on the suspension in the pump means 16:

$$P_{suck} = p \cdot l \cdot v^2 / r$$

p = density of the suspension
l = length of the pipe
v = mean peripheral speed of the pipes
r = mean radius for the rotation movement of the pipes At given peripheral speed and radius, thus, the intensity of the suction is determined by the independently selected pipe length and, thus, can be adapted to different pulp qualities and concentrations.

The rotation of the cleaning drum 8, further, causes the suspension in the inner screen space 10 to rotate, so that a relative movement between the suspension and the screen drum 5 and also between the suspension and the cleaning drum 8 is obtained. Hereby the aforementioned directioning of shives in front of the screen apertures 6 and 15 is effected.

It is advantageous that the pulp suspension being charged through the apertures 15 has the same concentration and impurities content all along the cleaning drum 8. This requires mixing along the outer screen space 9. The afore-described screening apparatus, therefore, is provided with the recirculation conduit 17, which according to FIG. 1 extends from the reject outlet 4 to a position above the shaft of the cleaning drum 8. Owing to the rotation of the cleaning drum 8, the pressure in the outer screen space 9 outside the cleaning drum 8 is higher than the pressure above the cleaning drum 8. Thereby a pressure drop over the conduit 17 is generated, so that recirculation over the outer screen space 9 is maintained and a substantially improved mixing in said space is obtained. The recirculation conduit also can be connected in other places above the cleaning drum 8 than centrally, and also several conduits can be used. Owing to the more efficient mixing in the outer screen space 9, the reject fibre flow out of the outlet 4 can be held low even at high material concentrations.

The FIGS. 2–8 show three different embodiments of the pump means 16. FIG. 2 shows a pump means in the form of a straight pipe 16, which is attached to the cleaning drum 8 and extends radially relative thereto and to the screen drum 5. See FIG. 3, which is a section transverse to the rotation axis of the cleaning drum 8. 19 designates a mounting flange for the pipe.

FIG. 4 shows a pipe (seen against the rotation direction of the cleaning drum 8), which both is curved almost 90° from the rotation direction of the drum 8 and flattened at its end 20 inside of the cleaning drum 8 and facing toward the screen drum 5. Hereby the pipe end facing toward the screen drum 5 covers or sweeps over a surface of the screen drum 5 which in axial extension is wider than in the case of a circular pipe with the same diameter. FIG. 5 is a section of the pipe transverse to the rotation direction of the cleaning drum 8, and FIG. 6 shows the same pipe seen from the interior of the drums.

As appears from FIG. 5, the end facing toward the screen drum 5 also is chamfered, 21, which facilitates the sucking of particles from the surface of the screen drum 5. This chamfering can be carried out so as to extend all the way to the inside of the cleaning drum 8, which implies that also particles are sucked into the pipe which are pressed by the centrifugal force against the inside of the cleaning drum 8. The pump means shown in FIGS. 4–6 further can be arranged slightly turned so that the portion of the pipe 16 located outside the cleaning drum 8 is directed upward or downward in relation to the vertical shaft of the cleaning drum. Hereby a certain flow directioning effect on the suspension in the outer screen space 9 is brought about.

FIGS. 7 and 8 show an embodiment where the pump means have the form of a slot 22 in the cleaning drum 8 and the axially opposed edges of the slot are defined by straight rectangular blades 23. The blades, as shown in FIG. 8, are arranged slightly inclined relative to the rotation direction of the cleaning drum 8 and together with the slot 22 act as a pump means acting as described above. The slot edges located perpendicularly to the axial ones are not provided with blades or flanges and thereby facilitate the removal of the particles lying on the inside of the cleaning drum 8.

It is possible within the scope of the invention idea to design the pump means to conically widen outward, whereby a possible clogging of the pump means effectively is avoided, or to conically taper outward, whereby the pumped flow is reduced. The pump means also may be designed with different deflections and with different cross-sections.

The radial position of the pump means 16 on the cleaning drum 8 also can be varied, so that the main portion of the pump means either lies inside or also outside of the drum. For operational reasons, a gap 24 is located between the screen drum 5 and lower edge of the rotary cleaning drum 8. In order to prevent particles and impurified pulp suspension from being transported away from the outer screen space 9 via the gap 24 to the inner screen space 10, the cleaning drum 8 can carry at its lower edge pump vanes or pump shovels 25, which by their orientation bring about a pump effect outward to the outer screen space 9.

The pump means 16 can be mounted on rotary arms or other members instead of on the perforated cleaning drum 8.

What we claim is:

1. Screening apparatus comprising a cylindrical screen plate having apertures through which a fluid flows in a radial direction so that material dispersed in the fluid collects on the cylindrical surface of the screen plate; and means for producing suction to clean the aperture by removing screened material therefrom, said means including, at least one pumping means mounted in a carrier provided with apertures and rotatable with respect to the screen plate and having the shape of a channel-like nozzle extended radially to the screen plate and having an open inlet end closely facing said surface of the screen plate, and means for moving said carrier and pumping means along a circular path substantially concentric with said cylindrical surface of the screen plate at a velocity which creates suction at said nozzle inlet end sufficient to remove screened material from said cylindrical surface of the screen plate and to conduct the material into and through the pumping means, said apertures in the carrier having a radial extension considerably smaller than said channel-like nozzle to allow recirculation of the main part of the removed material to the screen plate.

2. Apparatus as in claim 1 wherein said carrier is a rotatable drum which surrounds the cylindrical screen plate.

3. Apparatus as in claim 2 wherein said drum is provided with apertures.

4. Apparatus as in claim 2 wherein the open inlet end of the nozzle is planar and is inclined with respect to the axis of said cylindrical screen plate in a direction such that said open inlet end faces slightly in the direction of rotational movement of the pumping means.

5. Apparatus as in claim 2 wherein said nozzle has the form of a straight pipe open at both ends.

6. Apparatus as in claim 2 wherein said nozzle has the form of an angled pipe open at both ends.

7. Apparatus as in claim 2 wherein said nozzle has the form of a conical pipe with the narrowest end facing toward the screen plate.

8. Apparatus as in claim 2 wherein said nozzle has the form of a conical pipe with the narrowest end remote from the screen plate.

9. Apparatus as in claim 2 wherein said nozzle has the form of an aperture in said drum.

10. Apparatus as in claim 9 wherein said aperture is elongated in the direction of the axis of said drum.

11. Apparatus as in claim 10 wherein each long side of the aperture is provided with a flange extending toward the screen plate.

12. Apparatus as in any one of claims 1 to 3 wherein the open inlet end of the nozzle is planar and parallel to the axis of said cylindrical screen plate.

13. Apparatus for removing screened material from the apertures in a cylindrical screen plate through which a dispersion of solid material in a liquid flows in a radially inward direction so that the dispersed material collects on the exterior surface of the screen plate, said screen plate being disposed concentrically within and radially spaced from a casing into which the dispersion is introduced, said apparatus comprising a cylinder disposed between said screen plate and concentric to said screen plate and said casing, said cylinder having radially facing apertures therein which are larger than the apertures in said screen plate whereby dispersion flows inwardly through the apertures in said cylinder; a plurality of nozzles carried by said cylinder, said nozzles forming passageways of greater cross-sectional area than the apertures in said screen plate and extending generally radially from said cylinder toward said screen plate and from said cylinder into the space between said cylinder and said casing, said nozzles having open inlet ends close to said screen plate and open outlet ends in communication with the space between said cylinder and said casing; and means for rotating said cylinder about its axis at a velocity such that centrifugal force acting on the dispersion in said nozzles creates such at said nozzle inlet ends sufficient to remove screened material from the exterior surface of said screen plate by said suction and to conduct the removed material to the space between said cylinder and said casing.

14. Screening apparatus for separating coarser material from a dispersion of different sized material in a liquid comprising a generally cylindrical casing having an inlet for the dispersion; a cylindrical apertured screen plate located in the casing such that material collects on one surface of the screen plate as liquid and accepted material flow radially through the apertures in the screen plate; and suction means for removing the coarser material from said one surface by suction and for recycling the removed material to the liquid flowing to the screen plate, said means including a hollow radially apertured carrier disposed concentrically between the casing and the screen plate and a plurality of radially extending nozzles carried by the hollow carrier, the nozzles having open inlet ends closely spaced to and facing said one surface of the screen plate and having outlet ends opening into the space between the casing and the hollow carrier, the radial dimension of the wall thickness and of the apertures in the hollow carrier being considerably smaller than the radial dimension of the nozzles; means for rotating the hollow carrier at a velocity great enough to remove material from said one surface of the screen plate by suction produced in the nozzles by centrifugal force and to conduct the removed material to the space between the hollow carrier and the casing whereby some of the removed material passes radially inwardly through the apertures in the hollow carrier; and means for discharging removed material from the casing.

* * * * *

UNITED STATES PATENT AND TRADEMARK OFFICE
CERTIFICATE OF CORRECTION

PATENT NO. : 4,346,007
DATED : August 24, 1982
INVENTOR(S) : Bo Norman and Karl-Johan Grundstrom It is certified that error appears in the above—identified patent and that said Letters Patent is hereby corrected as shown below:

On the front page format:

Paragraph [73] Assignee should be --Sunds Defibrator AB, Sundsvall, Sweden-- not "Svenska Traforskningsinstitutet, Stockholm, Sweden".

Signed and Sealed this

Twenty-fourth Day of May 1983

[SEAL]

Attest:

DONALD J. QUIGG

Attesting Officer

Acting Commissioner of Patents and Trademarks